(12) United States Patent
Hoshizawa et al.

(10) Patent No.: US 7,216,286 B2
(45) Date of Patent: May 8, 2007

(54) DATA REPRODUCING METHOD AND DATA REPRODUCING APPARATUS

(75) Inventors: Taku Hoshizawa, Kawasaki (JP); Yukari Katayama, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 518 days.

(21) Appl. No.: 10/746,007

(22) Filed: Dec. 26, 2003

(65) Prior Publication Data

US 2004/0205443 A1  Oct. 14, 2004

(30) Foreign Application Priority Data

Dec. 26, 2002 (JP) ............................. 2002-375847

(51) Int. Cl.
*H03M 13/00* (2006.01)
*G11F 11/00* (2006.01)

(52) U.S. Cl. ..................................... 714/785
(58) Field of Classification Search ................. 714/785
See application file for complete search history.

(56) References Cited

U.S. PATENT DOCUMENTS 7,028,214 B2 *  4/2006  Takashi et al. ................ 714/5

FOREIGN PATENT DOCUMENTS

| JP | 02-278573 | 11/1990 |
|---|---|---|
| JP | 05-114249 | 5/1993 |
| JP | 06-195878 | 7/1994 |
| JP | 08-055343 | 2/1996 |
| JP | 2002-216358 | 8/2002 |
| JP | 2002-222524 | 8/2002 |

* cited by examiner

*Primary Examiner*—Shelly Chase
(74) *Attorney, Agent, or Firm*—Townsend and Townsend and Crew LLP

(57) ABSTRACT

In encoding digital data, scrambling is executed after error correction encoding is completed. In decoding digital data, error correction processing is executed after descrambling is completed. In the error correction processing, after syndrome calculation is performed, syndrome $s_0$ is used to determine the location and value of an error; the error value is subtracted from each syndrome value; and the result is divided by a fixed value. This process realizes a digital data encoding and decoding system providing substantially the same correcting ability as a conventional process except that error propagation occurs through descrambling.

10 Claims, 20 Drawing Sheets

FIG.6

| b47 | b46    | b45  | b44 | b43 | b42    | b41 | b40 |
|-----|--------|------|-----|-----|--------|-----|-----|
| CPM | CP_SEC | CGMS |     |     | Reserved | | |

| b39 | b38 | b37 | b36 | b35 | b34 | b33 | b32 |
|-----|-----|-----|-----|-----|-----|-----|-----|
| Reserved | | | | | | | |

| b31 | b30 | b29 | b28 | b27 | b26 | b25 | b24 |
|-----|-----|-----|-----|-----|-----|-----|-----|
| Reserved | | | | | | | |

| b23 | b22 | b21 | b20 | b19 | b18 | b17 | b16 |
|-----|-----|-----|-----|-----|-----|-----|-----|
| Reserved | | | | | | | |

| b15 | b14 | b13 | b12 | b11 | b10 | b9 | b8 |
|-----|-----|-----|-----|-----|-----|-----|-----|
| Reserved | | | | | | | |

| b7 | b6 | b5 | b4 | b3 | b2 | b1 | b0 |
|----|----|----|----|----|----|----|----|
| Reserved | | | | | | | |

FIG.7

| Initial Preset No. | Initial Value | Initial Preset No. | Initial Value |
|---|---|---|---|
| 0h | 0001h | 8h | 0010h |
| 1h | 5500h | 9h | 5000h |
| 2h | 0002h | 0Ah | 0020h |
| 3h | 2A00h | 0Bh | 2001h |
| 4h | 0004h | 0Ch | 0040h |
| 5h | 5400h | 0Dh | 4002h |
| 6h | 0008h | 0Eh | 0080h |
| 7h | 2800h | 0Fh | 0005h |

DATA REPRODUCING METHOD AND DATA REPRODUCING APPARATUS

BACKGROUND OF THE INVENTION

The present invention relates to information reproducing techniques for information recording media. In particular, the present invention relates to an information reproducing technique for an optical disk.

DVDs with a capacity of 4.7 gigabytes and above are becoming common as high density and high capacity optical disks to replace CDs. In addition, the next generation of optical disks using blue lasers is currently being standardized. Recording and reproduction technologies in this field are advancing toward still higher density, and there is a demand for superior signal processing techniques.

Among the signal processing techniques employed for such familiar optical disks as CDs and DVDs, is one referred to as "scramble." This signal processing is characterized in that the length of data composed of pits, spaces, marks and the like on an optical disk is changed randomly at long intervals. These changes are intended to reduce crosstalk and adverse effects on the servo error signal due to adjacent identical data, to obtain a good data reproduction waveform and a steady tracking servo.

Moreover, in the case of phase-change disks such as CD-RW, DVD-RAM and DVD-RW, writing to the same place a number of times deteriorates the disk material and may result in a situation where data cannot be recorded or reproduced properly. One solution to this problem is a method disclosed in Japanese Patent Laid-open No. 2002-216358. This method superimposes different data on recorded data each time the data is written to change the written data each time.

This invention provides an improved solution in which when recording a disk, scrambling is performed after error correction encoding in the process of data processing.

BRIEF SUMMARY OF THE INVENTION

Scrambling or data randomization is conventionally done to achieve a steady tracking servo, and it is desirable to scramble as much record data as possible. In the method described in Japanese Patent Laid-open No. 2002-216358, however, not all record data are scrambled after error correction encoding is performed.

Thus, this method may not provide satisfactory results, not only in servo performance but also in suppression of the phase-change disk material's degeneration. Such degradation may even prevent proper data recording and reproduction when writing to the same location a number of times. In conventional data converting processing methods, which scramble data before error correction encoding, however, when the same data is to be written to the same place on the disk, it is necessary to re-perform scrambling and error correction encoding for the data. This makes data conversion inefficient in both speed and power consumption.

This invention provides a new error correcting method to realize scrambling of all record data after error correction encoding is done. The problem mentioned above is solved in the digital data decoding process by descrambling data which were scrambled and then performing error correction processing on the descrambled data.

The error correcting ability of this error correction processing is almost the same as conventional processing, although error propagation occurs through descrambling. In this error correction processing, syndrome S0 obtained by syndrome calculation is used to determine the locations and values of errors included in specific data and then calculated syndrome Sn (n is an integer) is divided by a fixed value.

According to an aspect of the present invention, a data reproduction method is provided for reproducing recorded data from a recording medium wherein the recorded data is generated by generating an error correction block by adding error correcting parity to data comprising main data and identification data and error correcting parity for the main data and the identification data; and converting the data in the error correction block by superimposing data, generated from data conversion information on the data in the error correction block. The data reproduction method comprises the steps of reading out the data conversion information from the recording medium; generating the superimposed data from the data conversion information; deconverting the converted data by using the data conversion information read out and the superimposed data generated; calculating syndromes of the de-converted data and, if one of the multiple calculated syndromes, Sn (n is an integer), is not zero, making a decision that the last data of the de-converted data includes an error; correcting the last data and returning the corrected last data into the error correction block; and reproducing the data in the error correction block by removing the error correcting parity from the error correction block.

BRIEF DESCRIPTION OF THE DRAWINGS

FIG. 6 illustrates CPR_MAI in the data area of FIG. 4;

FIG. 7 lists the initial values of a shift register;

DETAILED DESCRIPTION OF THE INVENTION

With reference to the drawings, the following describes the DVD format as an example of a recording format. Then an embodiment implemented by applying the present invention to this recording format is described. The present invention is not limited to the DVD format, and can be adapted to many recording media including other optical disks and other formats.

Figure 3:
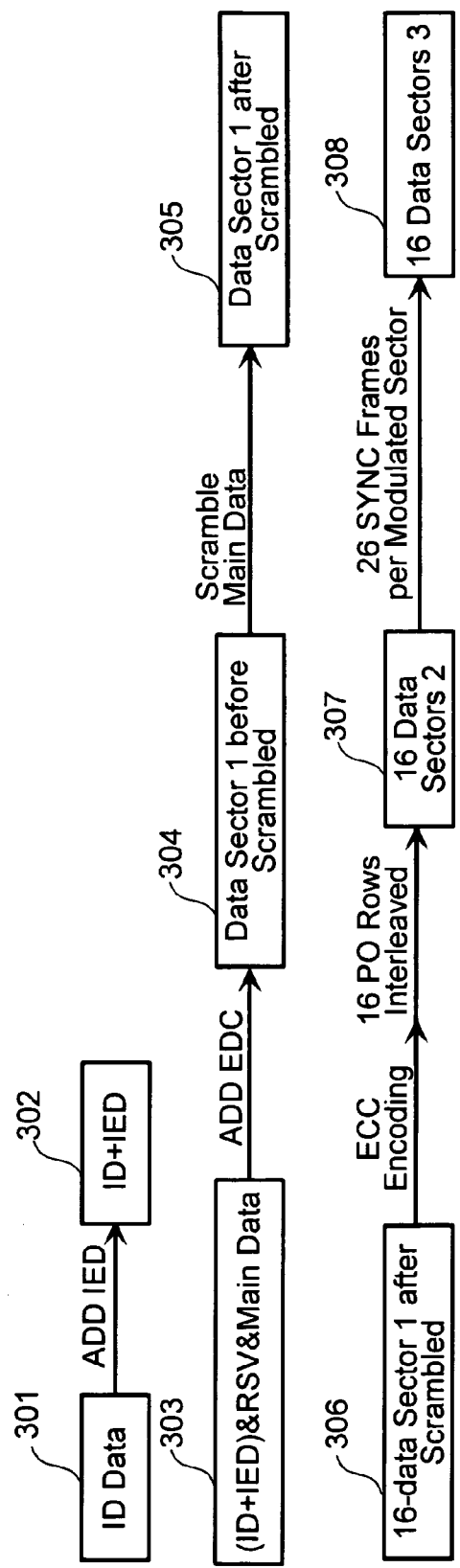
FIG. 3 illustrates a procedure of processing to configure a physical sector.

The DVD recording data format is described next. FIG. 3 shows a processing procedure to configure a DVD physical sector. Each sector is named differently depending on the stage of signal processing. A sector is called a data sector (scrambled data sector 1) 305, a record sector (data sector 2) 307 and a physical sector (data sector 3) 308. A sector is processed according to the processing procedure (encoding flow) of FIG. 3 to configure physical sectors.

Figure 4:
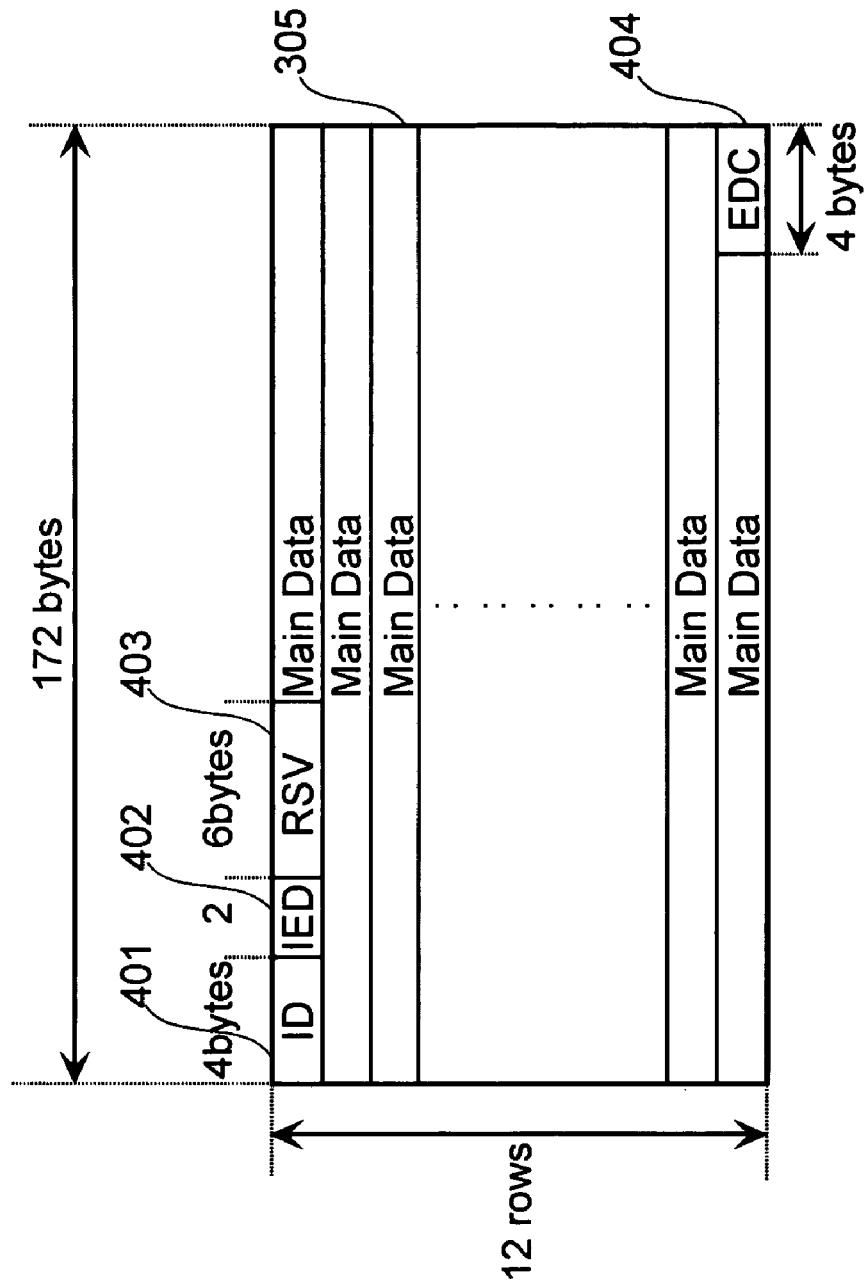
FIG. 4 illustrates a data sector of the physical sector in FIG. 3.

FIG. 4 shows the configuration of a data sector 305. Data sector 305 is 2064 bytes of data which contains 2048 bytes of main data, 12 bytes of data identification address information including ID (Identification Data) 401 and 4 bytes of error detection parity (EDC: Error Detection Code) 404. Data sector 305 is composed of 12 rows of 172 bytes each. After the EDC is calculated, scrambled data is added to 2052 bytes of main data in the data sector. EDC 404 shown in FIG. 4 is a check code given to the 2060 bytes of the pre-scramble data sector. EDC 404 is checked after error correction to determine whether any error was included in the data sector due to the impossibility of correction or a wrong correction.

Figure 5:
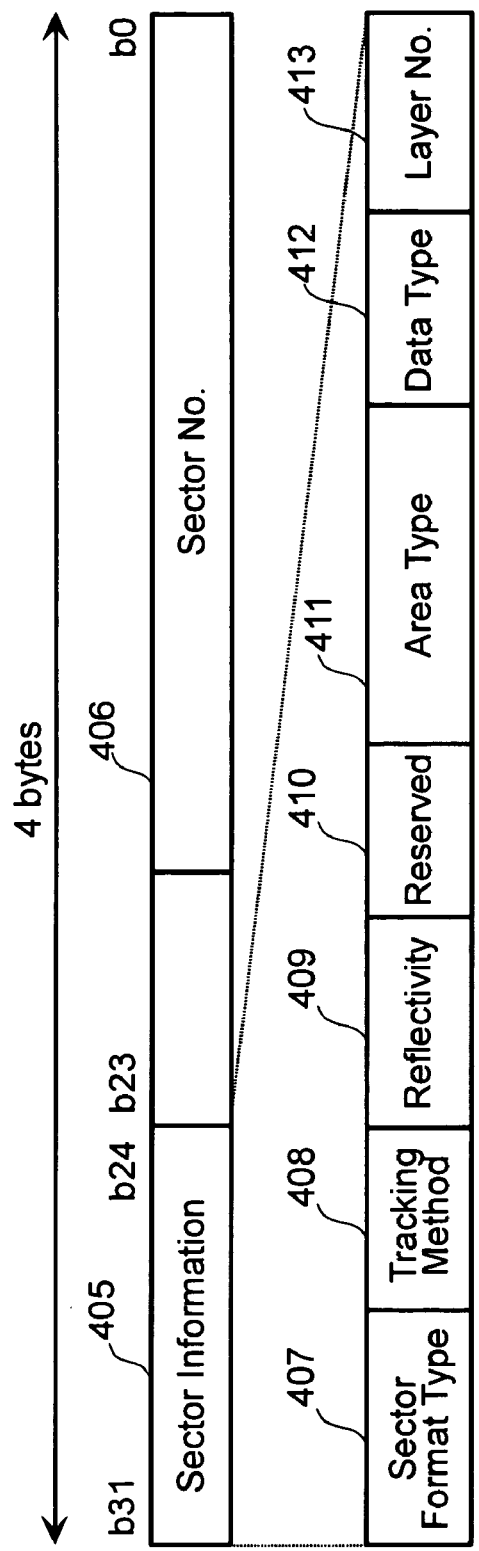
FIG. 5 illustrates identification data (ID) of the data sector in FIG. 4.

FIG. 5 shows the configuration of the ID 401. The ID has 3 bytes of sector information (data field information) and 1 byte of a sector number (data field number). Sector information 405 includes the disk's format type (sector format type) information 407, tracking method information 408 and reflectivity information 409. In addition, sector information 405 includes: area type information 411 indicating the area is a data area, lead-in area or lead-out area; data type information 412 indicating the data is read-only, write-once or rewritable; and layer number information 413 specifying a layer of the disk. Sector number 406 is one of 030000 h and subsequent numbers which are given serially to the data area.

FIG. 6 shows the configuration of CPR_MAI (Copyright Management Information) 403 which RSV 403 in the data area of FIG. 4 contains when the disk is used as a DVD-ROM. Of the 48 bits, the DVD-ROM format uses 4 bits at present. In b47, CMP (Copyright Material) indicates whether this sector contains copyrighted material. In b46, CP_SEC indicates whether this sector contains a data structure unique to the copyright protection system. In b45 and b44, CGMS (Copy Generation Management System) or copy restricting information is recorded.

Figure 8:
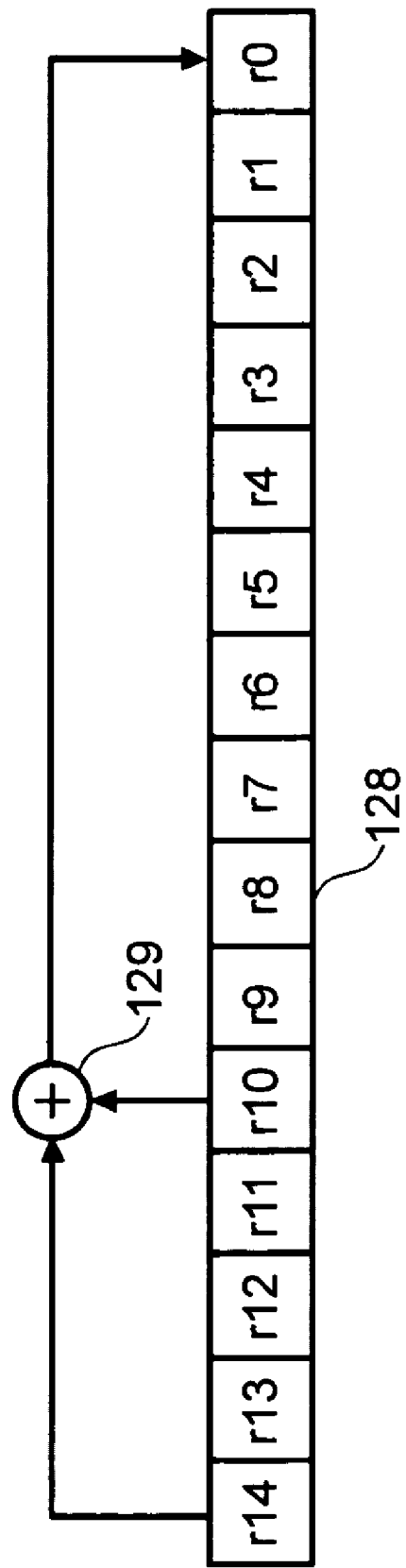
FIG. 8 illustrates the configuration of a feedback type shift register to generate scrambled data.

FIG. 7 shows the initial values of the shift register. FIG. 8 shows a scrambling random data generation circuit used for scrambling. In this figure, reference numeral 128 denotes a 1-bit register and 129 denotes an adder (exclusive OR). Scrambling random data is generated repeatedly by shifting the shift register by 8 bits. The initial value set to the shift register in FIG. 8 is associated with the corresponding initial preset number as shown in FIG. 7. In DVDs, since the initial preset number corresponds to the 4 bits b7 through b4 of ID, the same scrambling random data are generated by this generation circuit unless the ID is not changed.

Then, an ECC (Error Correction Code) block is encoded with sixteen data sectors 305. Record sectors 307 are sectors resulting from this error correction encoding. In this encoding, PO (Parity of Outer-Code) and PI (Parity of Inner-Code) are added and interleaved row by row. Physical sectors 308 are obtained by adding a synchronization signal (SYNC code) to the top of every 91 bytes.

Figure 9:
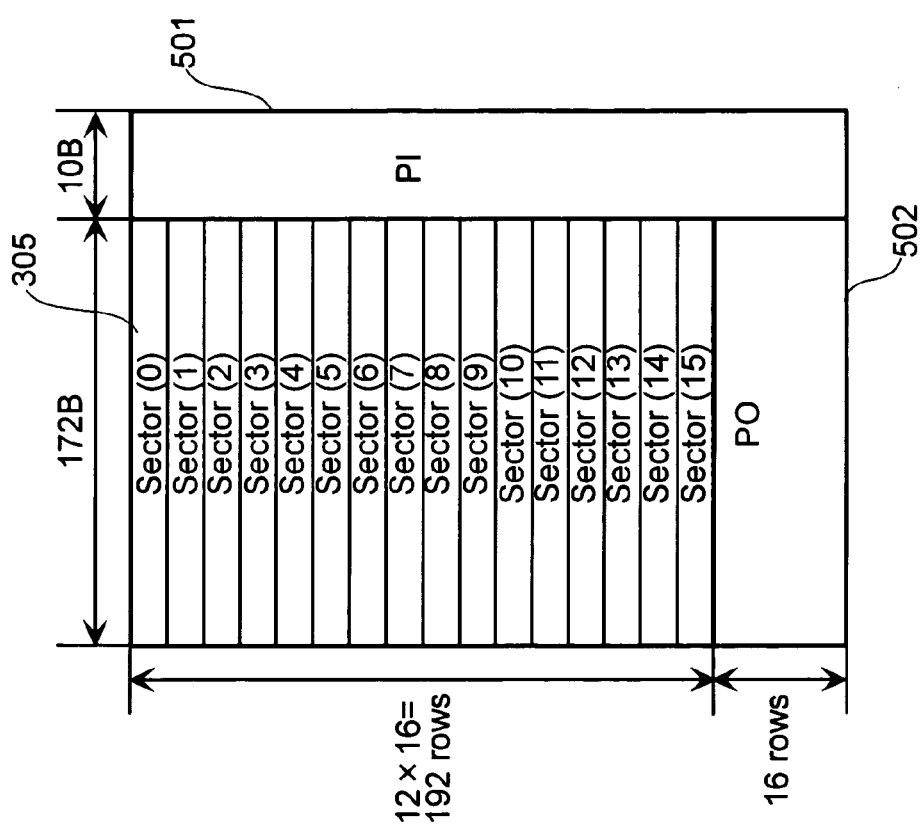
FIG. 9 illustrates an ECC block.
Figure 10:
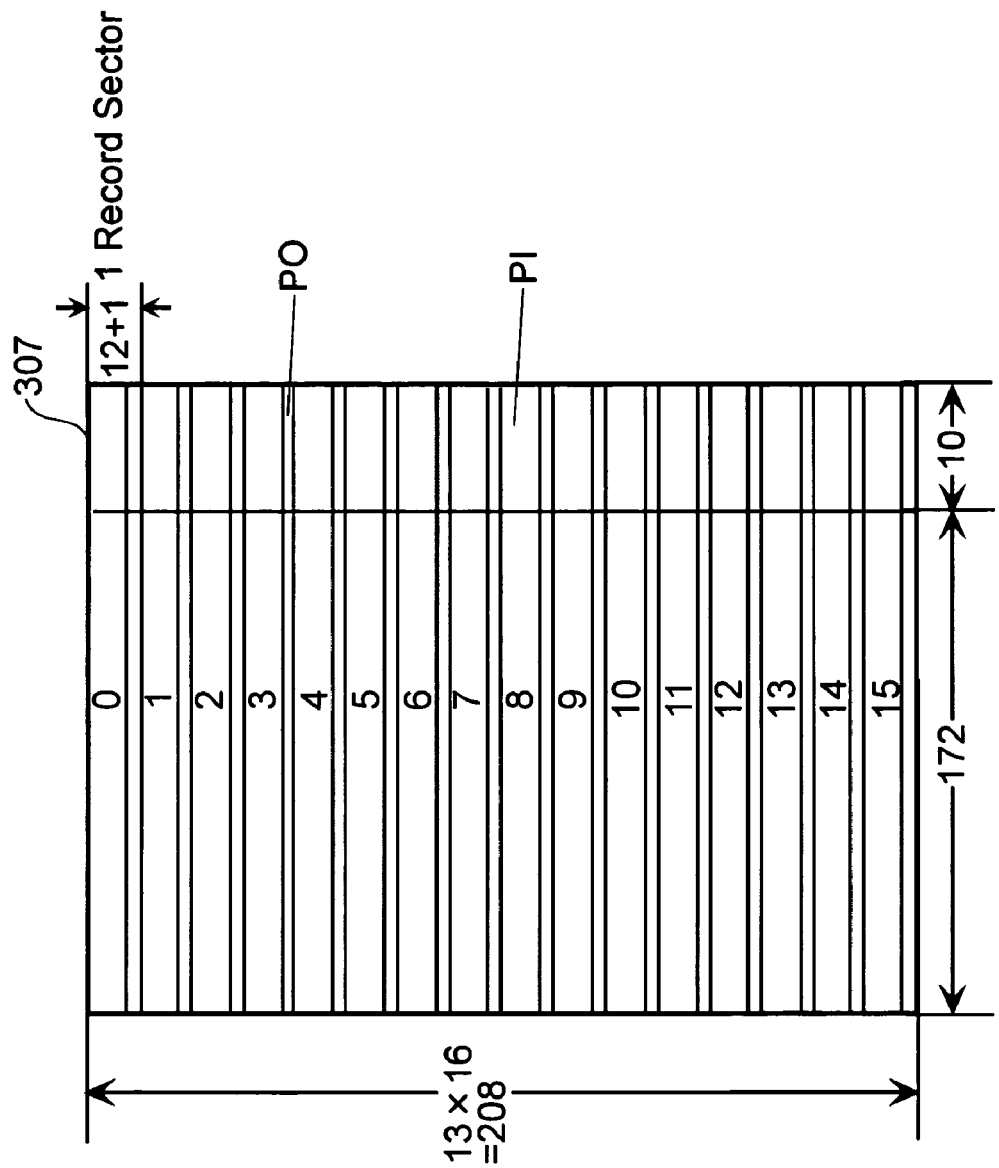
FIG. 10 illustrates a row-interleaved ECC block.

FIG. 9 shows the configuration of an ECC block. This ECC block has sixteen scrambled data sectors as an information field. For this information field, 172 bytes×192 rows or 172 bytes by 12 rows by 16 data sectors, 16 bytes of PO 502 are generated by the following generator polynomial:

$$G_{PO}(x)=(x-\alpha^0)(x-\alpha^1)\ldots(x-\alpha^{15})$$

thereby, forming a Reed-Solomon (208, 192, 17) outer code for each of the 172 columns. Then, 10 bytes of PI 501 are generated by the following generator polynomial:

$$G_{PI}(x)=(x-\alpha^0)(x-\alpha^1)\ldots(x-\alpha^9)$$

thereby, forming a Reed-Solomon (182, 172, 11) inner code for each of all 208 rows including PO 502. The ECC block in FIG. 9 goes through row by row interleaving and modulating before the block is recorded on the disk. This interleaving is done in such a manner that one of the 16 PO rows is inserted for every twelve data area rows as shown in FIG. 10. As mentioned earlier, each sector of 13 rows by 182 bytes in the post-interleave ECC block is called a record sector 307. This means each post-interleave ECC block has sixteen record sectors 307.

FIG. 10 shows the configuration of the ECC block after interleaving. A physical sector 308 can be configured by modulating an interleaved 2366 byte (13 rows by 182 bytes) record sector sequentially row by row while inserting a SYNC code 308 before the 0th and 91st columns of each row. Note that a SYNC code 701 and the subsequent modulated 91 bytes are called a SYNC frame. (See FIG. 11.)

Figure 11:
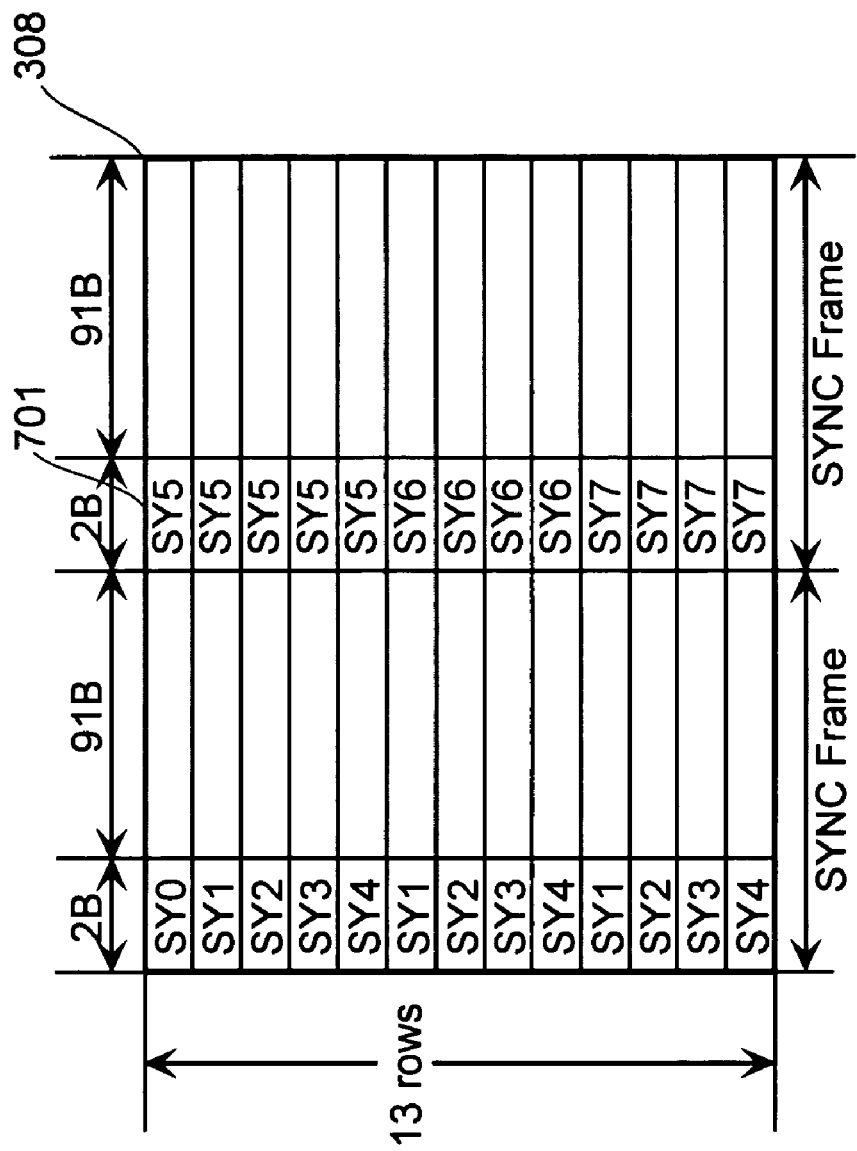
FIG. 11 illustrates a physical sector.

As shown in FIG. 11, one physical sector has 13 by 2 SYNC frames. Thus, since 8 bit input data is converted to 16 channel bits by 8/16 modulation, one physical sector has 38688 channel bits ((2 bytes+91 bytes)×2×13 rows×16 bits/byte). SYNC codes 701 are combined as shown in FIG. 11. The start of the sector is identified by SY0 (SYNC code "0") while each of the remaining rows can be identified by two codes selected cyclically from SY1 through SY4 and from SYN5 through SYN7, respectively. Error correction is done on an each ECC block basis. Although each ECC block has sixteen sectors, the top address of each sector, divisible by 16, is determined from the ID information which follows SY0. Thus, SY0 or the top of each block is highly important in the decoding of data. In addition, at the same time, the cyclicity of the other SYNC codes 701 is utilized to ensure the recognition of SY0.

Figure 12:
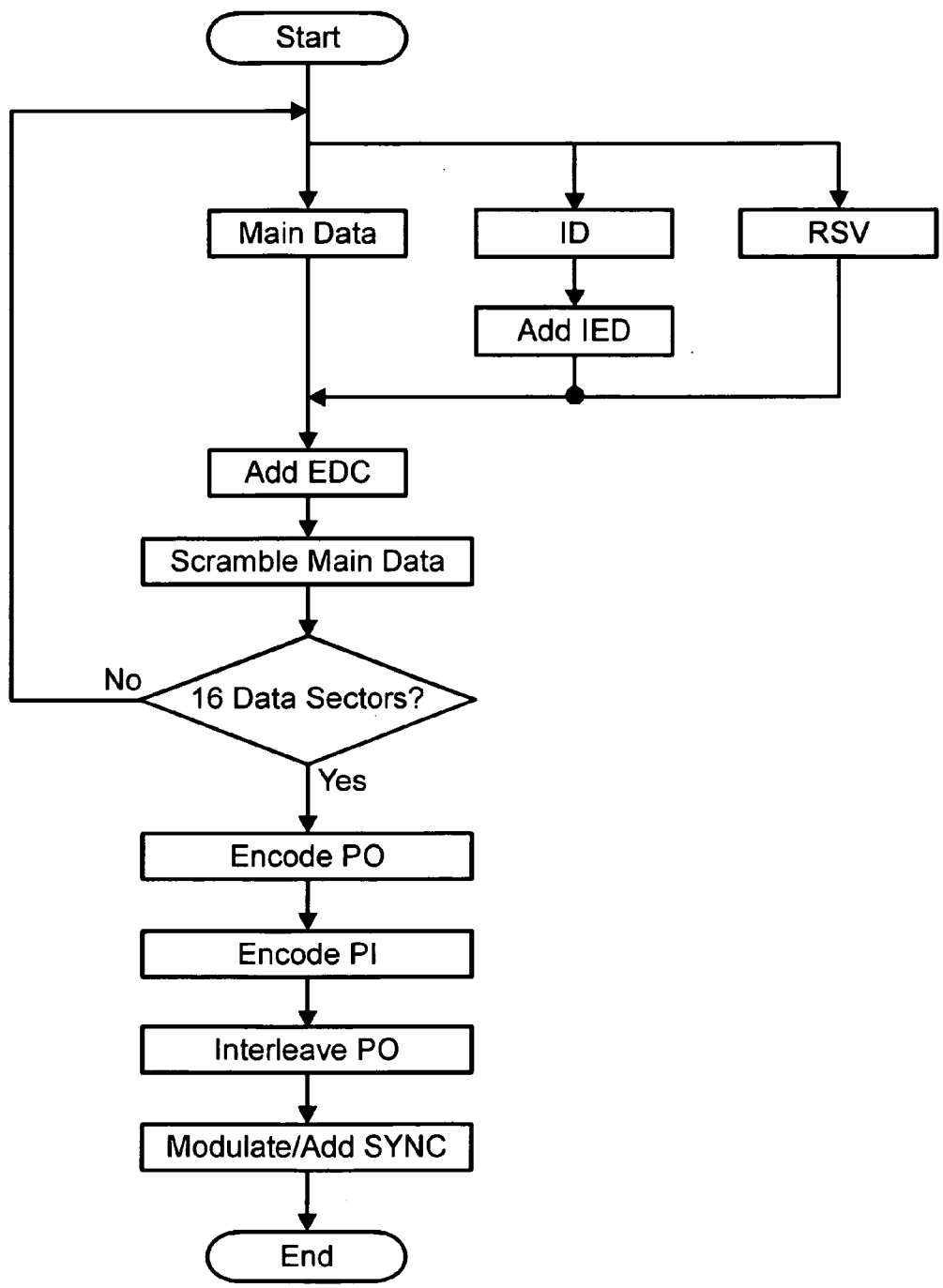
FIG. 12 is a flowchart illustrating the flows of DVD encoding.

FIG. 12 is a flowchart illustrating the flow of processing in generating record data shown in FIG. 3.

Figure 13:
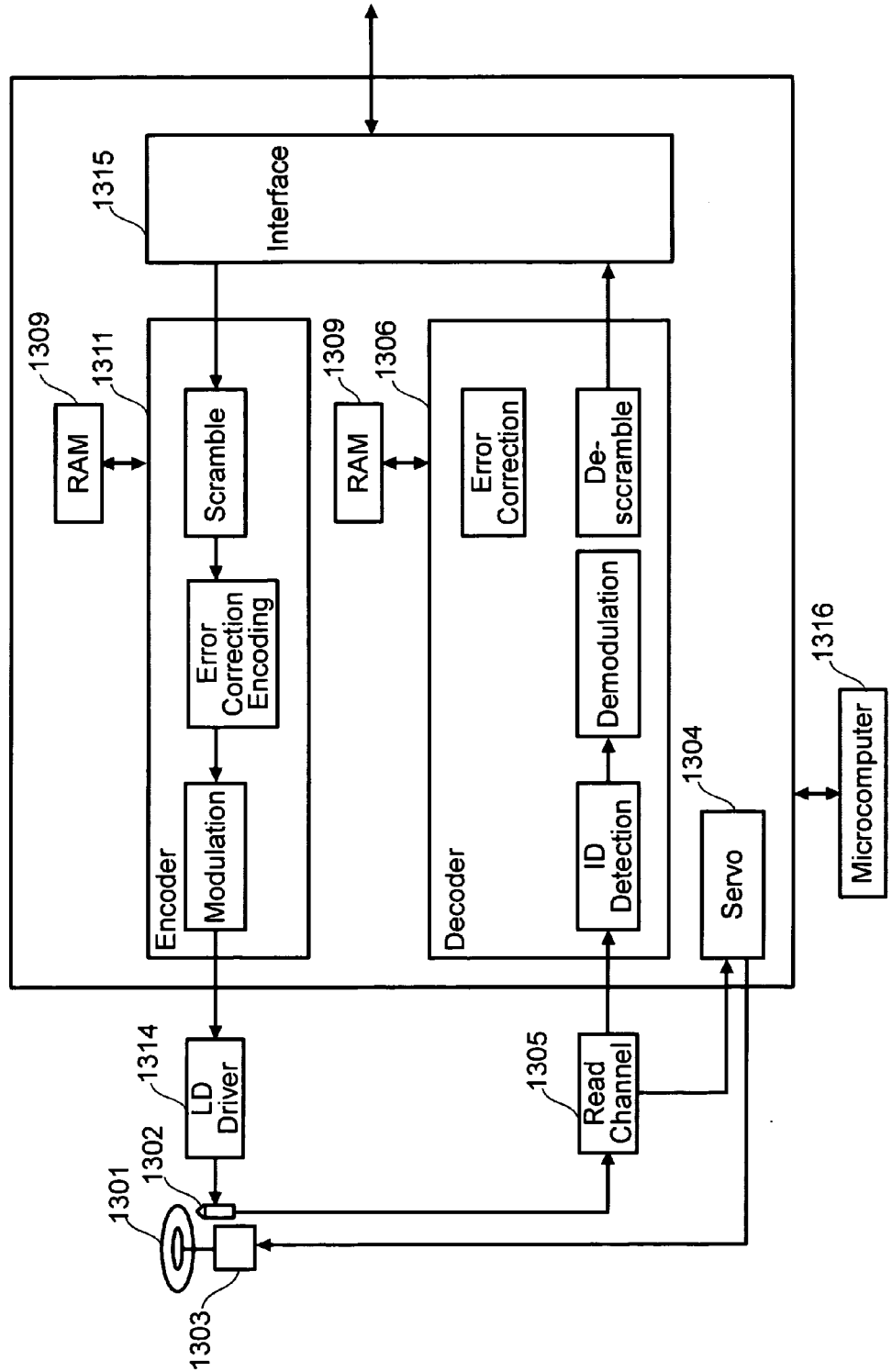
FIG. 13 is a block diagram illustrating a DVD recording and reproduction system.

FIG. 13 shows the configuration of a DVD-RAM drive, an example of an optical disk recording and reproduction apparatus. Reference numeral 1301 denotes an optical disk, 1302 denotes a pickup to read data from optical disk 1301, 1303 denotes a spindle motor to rotate the disk and 1314 denotes a laser driver. Reference numeral 1304 denotes a servo control process unit to control optical pickup 1302, etc. Reference numeral 1305 denotes a read channel which equalizes the waveform of the analog signal retrieved from disk 1301, puts it in binary format and generates a synchronization clock. Reference numeral 1306 denotes a decoder which performs such operations as demodulation of read data, error correction and descrambling for picked up data. Reference numeral 1309 denotes a RAM for temporally storing data. Reference numeral 1311 denotes an encoder which performs such operations as modulation of write data, error correction coding, scrambling and the like. Reference numeral 1315 denotes an interface which controls data input and output from and to the upper apparatus and 1316 denotes a microcomputer which takes control of the system. Since this configuration is depicted as an example of a DVD drive connected to a personal computer, interface 1315 is assumed to be connected to such devices as an MPEG board and HDD (Hard Disc Drive) in a personal computer. What can be connected to interface 1315 is not limited to such devices. The interface may also be connected to such devices as a STB (Set Top Box) receiver and other video/audio recording and reproducing devices.

The encoding processing to generate record data, shown in FIG. 3, is performed in encoder 1311. The particular signal processing to which the present invention relates is the decoding processing done in decoder 1306. The following describes the procedure of the decoding processing and the decoding circuit.

Figure 1:
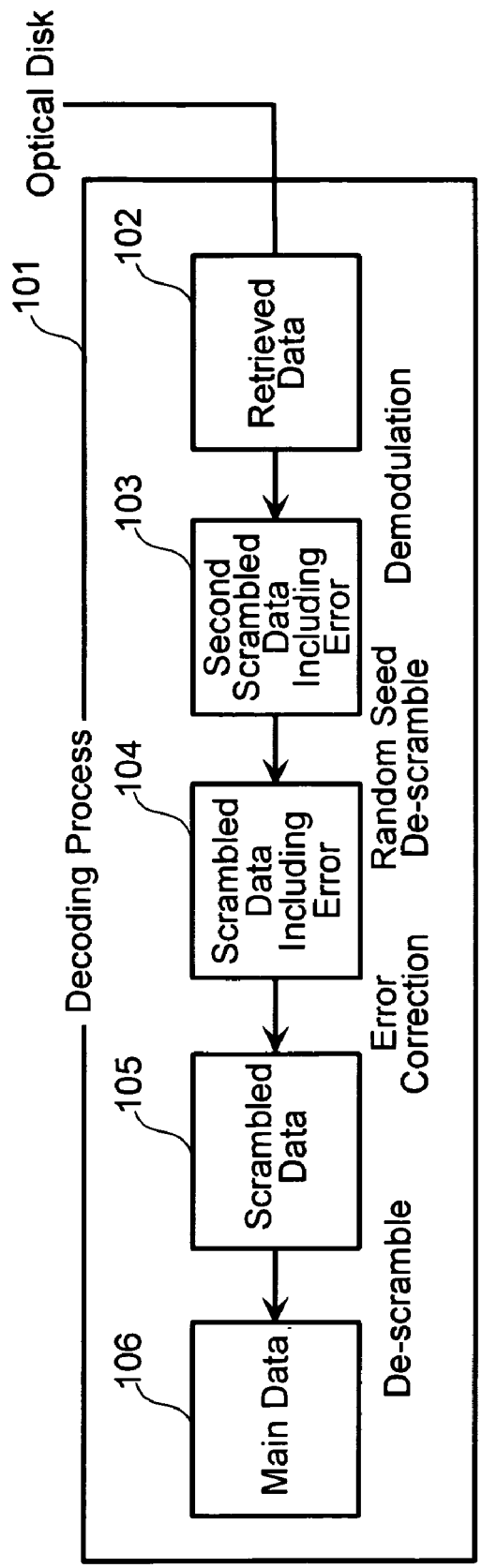
FIG. 1 illustrates an example of an optical disk reproduction system according to the present invention.

FIG. 1 illustrates a method of decoding data read from a recording medium, according to an embodiment of the present invention. It is assumed that the recorded data was scrambled after undergoing error correction encoding.

In this figure, reference numeral 102 denotes retrieved data; 103 denotes error-included in main data scrambled by two different methods (2nd scrambled data); 104 denotes error-included scrambled main data with scrambling data (scrambled data); 105 denotes scrambled data; and 106 denotes main data.

As mentioned earlier, the conventional scrambling method in a DVD apparatus presets the shift register to an initial value determined by the initial preset number which corresponds to four bits b7 through b4 of the ID. Thus the same scrambling data is generated unless the ID does not change. Since the ID is associated with an address on the disk, the same scrambling data is always generated for the same place on the disk. Further if the main data does not change, the same data is repeatedly recorded in the same place on the disk. To prevent this, it is necessary to change the scrambling data each time a write is done at the same place.

Figure 14:
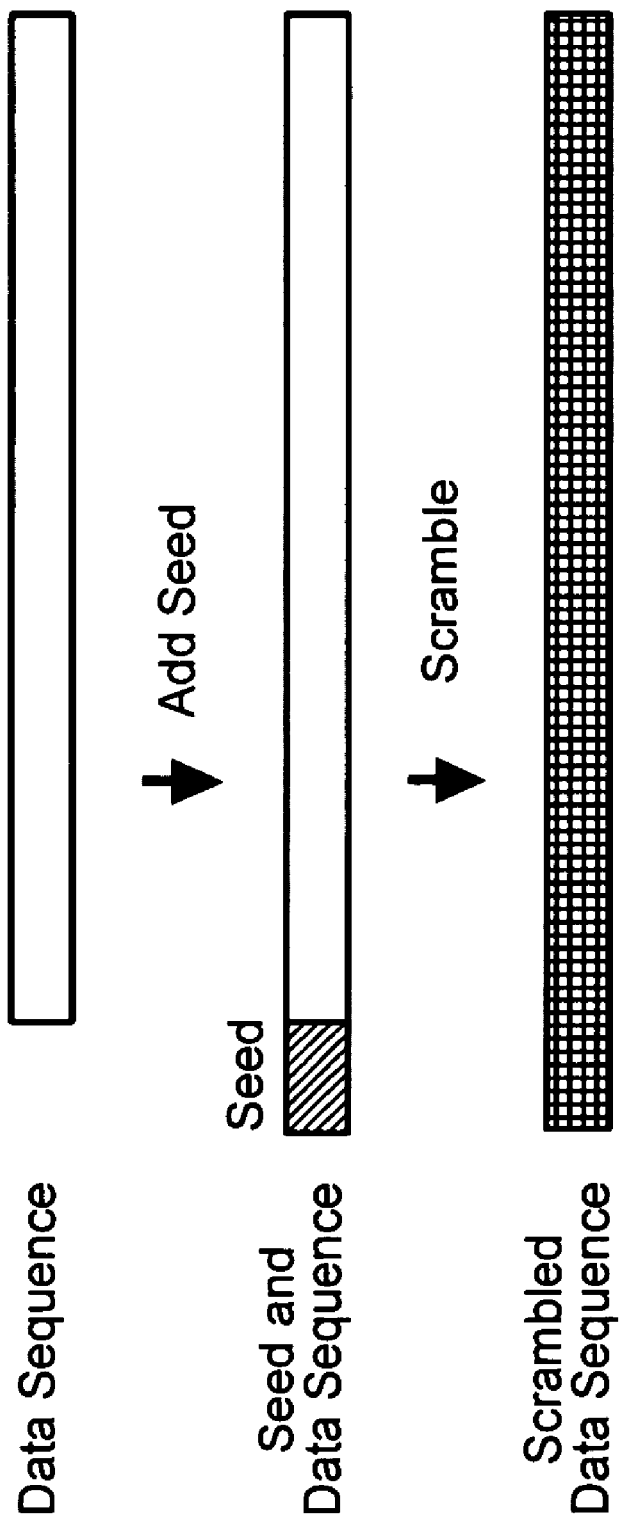
FIG. 14 illustrates random seed scrambling.

Accordingly, at recording, for example, random seed scramble is used as the second scrambling method performed after error correction encoding. FIG. 14 shows the process of random seed scramble. First, arbitrary data is appended to the top of a data column to be scrambled. Then, the all of the data including the seed is scrambled by a scrambling method defined by a specific scramble polynomial. When the same data is again to be recorded in the same place on the disk, a seed value different from the previously used one can be used to generate different 2nd scrambled data.

Figure 15:
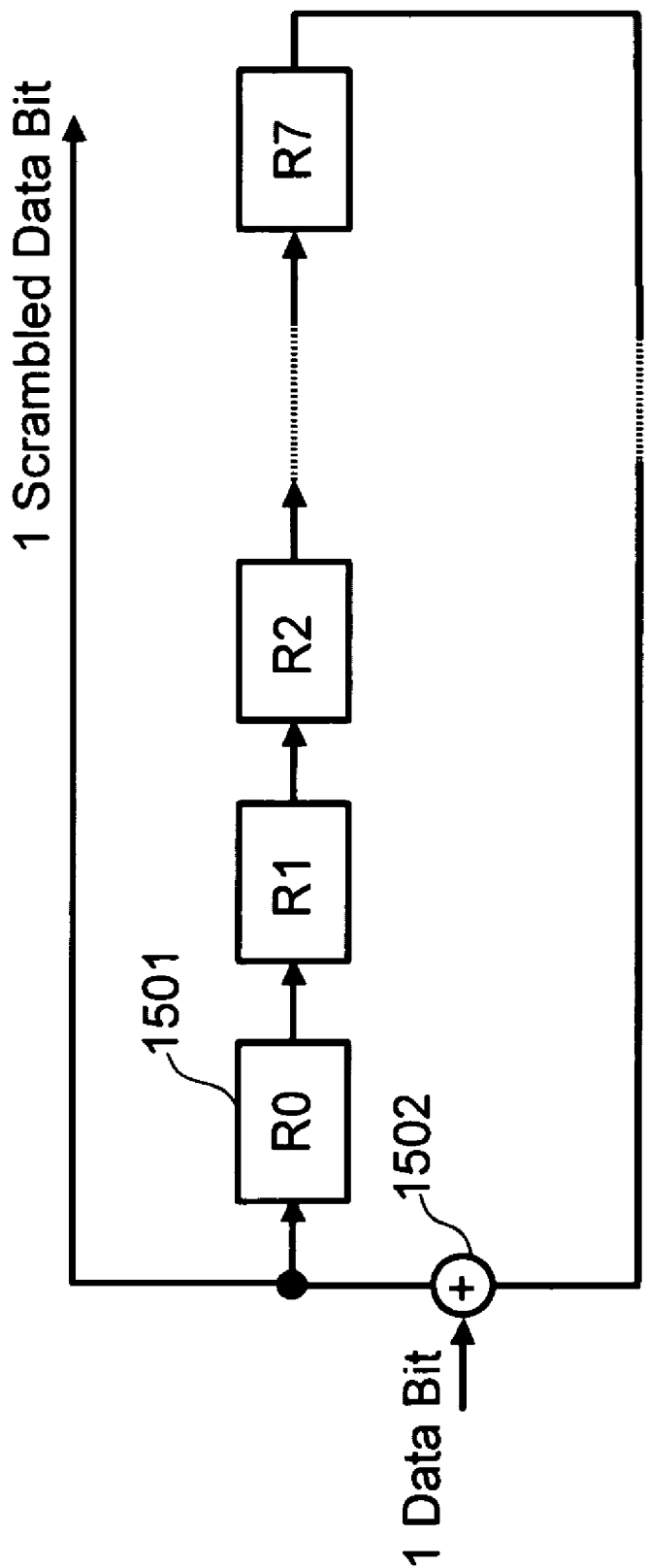
FIG. 15 is a diagram of a scramble circuit used in a random seed-scrambling method using scramble polynomial $S(x)=x^8$.

FIG. 15 illustrates one example of a circuit to implement the random seed scrambling method shown in FIG. 14. Here, the following scramble polynomial is used:

$G_{RSS}(X)=X^8$

In this figure, reference numeral 1501 denotes one of the registers constituting an 8-bit shift register and holds one bit of data. Reference numeral 1502 denotes an adder. If 8-bit random data is given to the shift register as the initial value, 2nd scrambled data is generated from input data. In this method, since errors do not propagate more than eight bits, even if reproducing the initial value fails, the subsequent scrambled data can be decoded.

Figure 16:
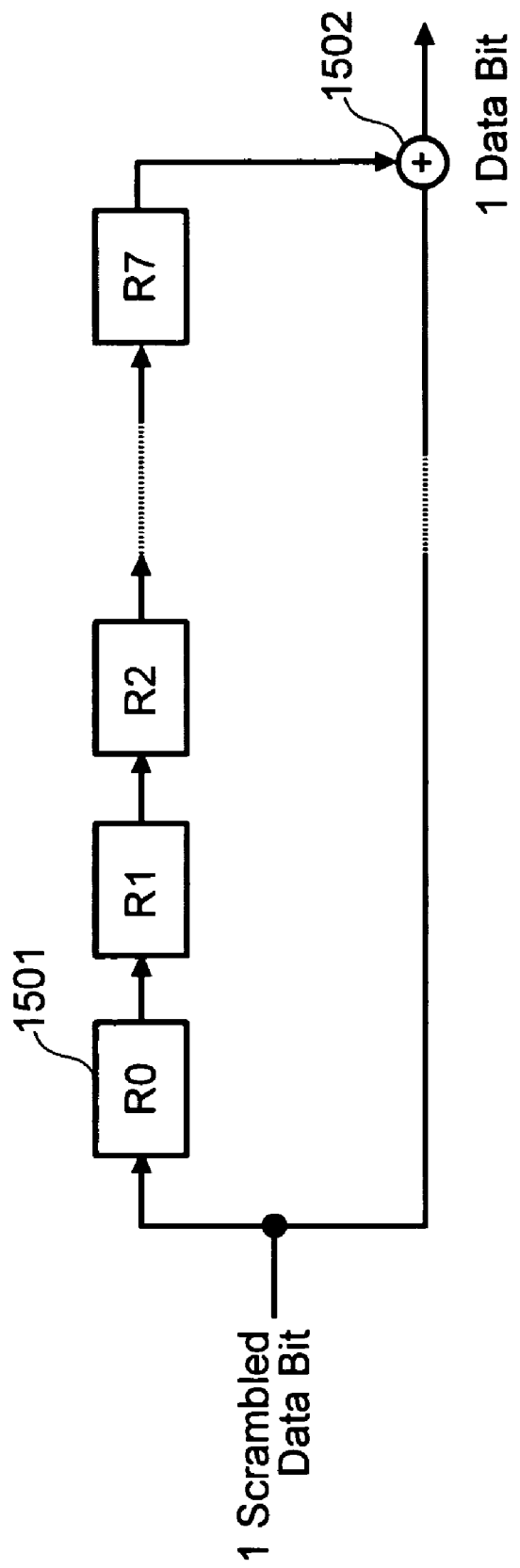
FIG. 16 is a diagram of a descramble circuit used in a random seed-scrambling method using scramble polynomial $S(x)=x^8$.

FIG. 16 shows an example of a decoding circuit configured to descramble data which was scrambled by the random seed scrambling method shown in FIG. 15. In this figure, reference numeral 1501 is one of the registers constituting an 8-bit shift register and holds one bit of data. Reference numeral 1502 denotes an adder. If the shift register is given a 8-bit initial value, scrambled data is generated from input 2nd scrambled data.

In this random seed scrambling method, scrambling is done by adding each bit to a bit which was scrambled eight bits ago, that is, by adding each byte to the last scrambled byte, since in a DVD apparatus pre-demodulation data is treated in 8 bits or in bytes.

That is, from n bytes of scrambled data:

$$\{D_{n-1}, D_{n-2}, D_{n-3}, \ldots, D_2, D_1, D_0\}$$

this random seed scrambling method generates 2nd scrambled data:

$$\{D'_{n-1}, D'_{n-2}, D'_{n-3}, \ldots, D'_2, D'_1, D'_0\}$$

by performing:

$D'_i=D_i+D'_{i+1}$, (where $D'_n=0$)

Then, the following describes how the error correction processing in the decoding process of FIG. 1 differs from the conventional error correction processing employed for DVDs.

Figure 17:
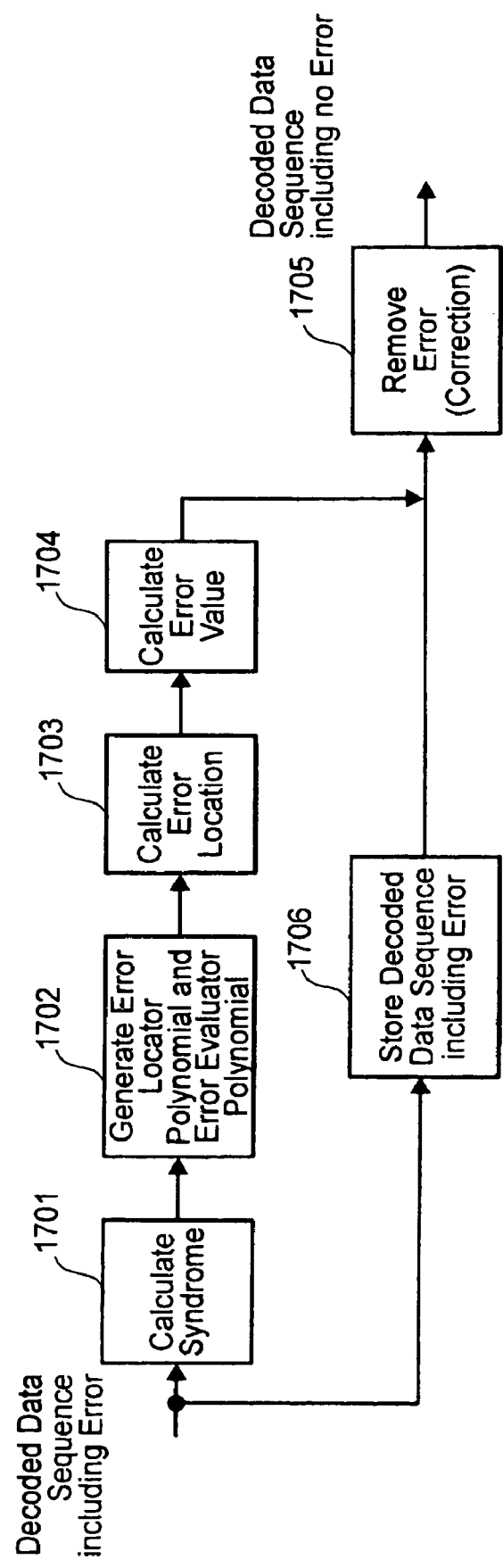
FIG. 17 is a block diagram illustrating an example of an error correction system.

FIG. 17 shows a conventional example of error correction processing. First, in the error correction processing, a syndrome calculation is performed on an error correction code-added data column which may include one or more errors.

A (1+m, 1, m+1) Reed-Solomon code is encoded by adding length m error correction parity P(x) to length l data column I(x) wherein:

$I(x) \cdot x^m + P(x) (=W(x))$ is divisible by generator polynomial $G(x)=(x-\alpha^0)(x-\alpha^1) \ldots (x-\alpha^{m-1})$ This Reed-Solomon code can correct up to (m/2) errors when m is even and up to ((m−1)/2) errors when m is odd. Since every $(x-\alpha^i)$ is an irreducible polynomial, the Reed-Solomon code W(x) is divisible by $(x-\alpha^i)$ (where, i=0, ..., m−1). This means $W(x) \bmod (x-\alpha^i) = W(\alpha^i))$.

Then, Y(x) is obtained by adding error polynomial $E(x)=e_{1+m-1}x^{1+m-1}+e_{1+m-2}x^{1+m-2}+ \ldots +e_1x+e_0$ (where, i=1+m−1, 1+m−2, ..., 0 and $e_i$ means no error if $e_i=0$ to $W(x)=w_{1+m-1}x^{1+m-1}+w_{1+m-2}x^{1+m-2}+ \ldots +w_1x+w_0$. Due to the definition of E(x), Y(x)(=E(x)+W(x)) means that Y(x) has no error when Y(x)=W(x) and includes one or more errors when Y(x)≠W(x). Therefore, the following holds:

$(Y(x) \bmod (x-\alpha_i)=(W(x)+E(x)) \bmod (x-\alpha_i)=W(\alpha_i)+E(\alpha_i)=E(\alpha_i)$ (where, i=0, ..., m−1)

That is, $Y(x) \bmod (x-\alpha_i)$ is determined by the values and locations of errors constituting E(X) not depending on the data column included in the error correction code W(x). This equation is termed syndrome $s_i$. The following describes what value syndrome $s_i$ takes for an actual error. The location and value of an error are denoted here as L i and $e_{L\_i}$, respectively.

If no error exists.

$$s_0 = 0$$
$$s_1 = 0$$
$$s_2 = 0$$
$$\vdots$$
$$s_{m-1} = 0$$

If one error exists.

$$s_0 = e_{L1}$$
$$s_1 = e_{L1} \cdot \alpha^{L1}$$
$$s_2 = e_{L1} \cdot (\alpha^{L1})^2$$
$$\vdots$$
$$s_{m-1} = e_{L1} \cdot (\alpha^{L1})^{m-1}$$

If two errors exist.

$$s_0 = e_{L1} + e_{L2}$$
$$s_1 = e_{L1} \cdot \alpha^{L1} + e_{L2} \cdot \alpha^{L2}$$
$$s_2 = e_{L1} \cdot (\alpha^{L1})^2 + e_{L2} \cdot (\alpha^{L2})^2$$
$$\vdots$$
$$s_{m-1} = e_{L1} \cdot (\alpha^{L1})^{m-1} + e_{L2} \cdot (\alpha^{L2})^{m-1}$$

If n errors exist.

$$s_0 = \sum_{i=1}^{n} e_{Li}$$
$$s_1 = \sum_{i=1}^{n} e_{Li} \cdot \alpha^{Li}$$
$$s_2 = \sum_{i=1}^{n} e_{Li} \cdot (\alpha^{Li})^2$$
$$\vdots$$
$$s_{m-1} = \sum_{i=1}^{n} e_{Li} \cdot (\alpha^{Li})^{m-1}$$

Then, the following describes the configuration of the syndrome $s_i$ calculation circuit.

Figure 18:
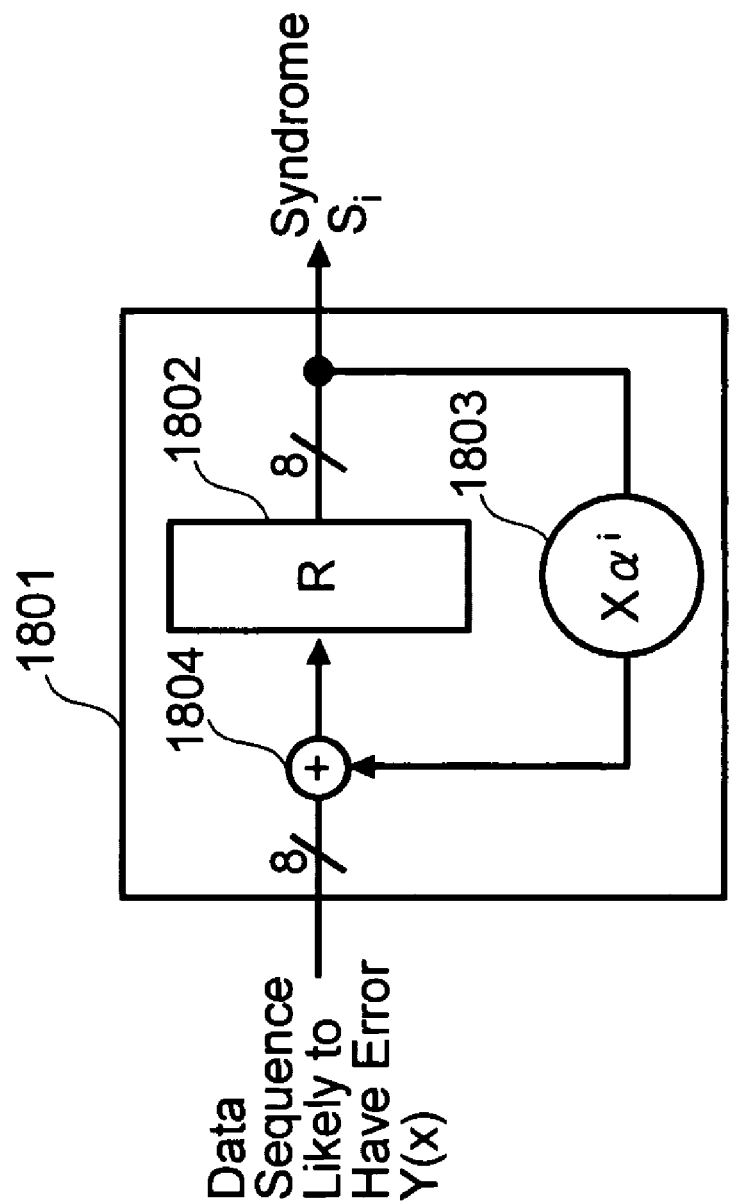
FIG. 18 is a syndrome $s_j$ calculation circuit diagram.

In FIG. 18, 1801 is a syndrome calculation circuit 1801 containing an 8-bit shift register 1802, $\alpha^i$ (on GF($2^8$)) multiplier circuit 1803, 8-bit adder circuit (exclusive OR). From data column Y(x) entered at a rate of 1 byte per clock cycle, this syndrome calculation circuit 1801 calculates the output syndrome $e_i$ as follows:

After 1 clock cycle: $s_i = y_{1+m-1} = w_{1+m-1} + e_{1+m-1}$

After 2 clock cycles: $s_i(y_{1+m-1}) \cdot \alpha^i + y_{1+m-2}$

After 3 clock cycles: $s_i = ((y_{1+m-1}) \cdot \alpha^i + y_{1+m-2}) \cdot \alpha^i + y_{1+m-3}$ The output syndrome $s_i$ obtained (1+m) clock cycles later is:

$$s_i = (\ldots((y_{l+m-1}) \cdot \alpha^i + y_{l+m-2}) \cdot \alpha^i + y_{l+m-3}) +$$
$$y_{l+m-4} \ldots) \cdot \alpha^i + y_1) \cdot \alpha^i + y_0$$
$$= y_{l+m-1} \alpha^{i \cdot (l+m-1)} + y_{l+m-2} \alpha^{i \cdot (l+m-2)} +$$
$$y_{l+m-3} \alpha^{i \cdot (l+m-3)} + \ldots + y_1 \alpha^i + y_0$$
$$= (w_{l+m-1} + e_{l+m-1}) \alpha^{i \cdot (l+m-1)} + (w_{l+m-2} + e_{l+m-2})$$
$$\alpha^{i \cdot (l+m-2)} + \ldots + (w_1 + e_1) + \alpha^i + (w_0 + e_0)$$
$$= W(\alpha_i) + E(\alpha_i)$$
$$= Y(x) \bmod (x - \alpha_i)$$

Thus, what should be obtained as $s_i$ is obtained.

As understood from the above description, if all syndromes are 0, it is determined that the error correction code-encoded data column has no error. Likewise, if at least one syndrome is not 0, the data column has one or more errors. If a data column is found to have an error, error locator and evaluator polynomials are generated by a method such as Euclid's algorithm from the calculated syndromes 1702. Then, the error's location is calculated by chain search or the like from the error locator polynomial 1703 and the error's value is determined from the error's location and error evaluator polynomial 1704. Finally, error correction processing is completed by removing the error from the error-included data column according to the obtained error location and value 1705.

The following describes how to correct an error which propagates through the random seed scramble shown in FIG. 1, that is, clarifies how the error correction processing in FIG. 1 is different from the conventional error correction processing.

As already described, error propagation through the random seed scramble in FIG. 1 occurs due to the scramble polynomial S(x)=$x^8$ as follows:

Assume a data column

{D'$_{1+m}$, ..., D'$_i$, D'$_{i-1}$, ..., D'$_1$, D'$_0$} which is generated by random seed scrambling after error correction encoding. If an error $e_{L+i}$ is added to a location D'$_i$, the data column becomes {D'$_{1+m}$, ..., D'$_i$+e$_L$ $_i$, D'$_{i-1}$, ..., D'$_1$, D'$_0$} and, after random seed descrambling, becomes

{D$_n$, D$_{n-1}$, ..., D$_i$+e$_L$ $_i$, D$_{i-1}$+e$_L$ $_i$, D$_{i-2}$, ..., D$_1$, D$_0$}

That is, the same error $e_L$ $_i$ propagates to the next byte.

Accordingly, by the error correction processing performed on the error-included in scrambled data 104 which has gone through the random seed descramble of FIG. 1, syndrome $S_i$ is calculated as shown below: Note that the location and value of an error in the 2nd scrambled data 103 are denoted as L i and e$_L$ $_i$, respectively.

If there exists no error, $$s_0 = 0$$

-continued $$s_1 = 0$$
$$s_2 = 0$$
$$\vdots$$
$$s_{m-1} = 0$$

If one error existed at location L1 (L 1≠0, that is, the error location is not the last byte location of the error correction code which ends the data column) in the 2nd scrambled data 103 and, after descrambling, increased to two errors, $$s_0 = e_{L1} + e_{L1} = 0$$
$$s_1 = e_{L1} \cdot \alpha^{L1} + e_{L1} \cdot \alpha^{L1-1}$$
$$s_2 = e_{L1} \cdot (\alpha^{L1})^2 + e_{L1} \cdot (\alpha^{L1-1})^2$$
$$\vdots$$
$$s_{m-1} = e_{L1} \cdot (\alpha^{L1})^{m-1} + e_{L1} \cdot (\alpha^{L1-1})^{m-1}$$

If one error existed at location L1 (L1=0, that is, the error location is the last byte location of the error correction code which ends the data column) in the 2nd scrambled data 103 and, after descrambling, the number of errors remained 1, $$s_0 = e_{L1}$$
$$s_1 = e_{L1} \cdot \alpha^0 = e_{L1}$$
$$s_2 = e_{L1} \cdot (\alpha^0)^2 = e_{L1}$$
$$\vdots$$
$$s_{m-1} = e_{L1} \cdot (\alpha^0)^{m-1} = e_{L1}$$

If two respective errors existed at locations L1 and L2 (L 1≠0 and L 2≠0) in the 2nd scrambled data 103 and, after descrambling, the number of errors increased to 3 or 4, $$s_0 = e_{L1} + e_{L1} + e_{L2} + e_{L2} = 0$$
$$s_1 = e_{L1} \cdot \alpha^{L1} + e_{L1} \cdot \alpha^{L1-1} + e_{L2} \cdot \alpha^{L2} + e_{L2} \cdot \alpha^{L2-1}$$
$$s_2 = e_{L1} \cdot (\alpha^{L1})^2 + e_{L1} \cdot (\alpha^{L1-1})^2 + e_{L2} \cdot (\alpha^{L2})^2 + e_{L2} \cdot (\alpha^{L2-1})^2$$
$$\vdots$$
$$s_{m-1} = e_{L1} \cdot (\alpha^{L1})^{m-1} + e_{L1} \cdot (\alpha^{L1-1})^{m-1} + e_{L2} \cdot (\alpha^{L2})^{m-1} + e_{L2} \cdot (\alpha^{L2-1})^{m-1}$$

If two respective errors existed at locations L1 and L2 (L 2=0) in the 2nd scrambled data 103 and, after descrambling, the number of errors remained 2 or increased to 3, $$s_0 = e_{L1} + e_{L1} + e_{L2} = e_{L2}$$
$$s_1 = e_{L1} \cdot \alpha^{L1} + e_{L1} \cdot \alpha^{L1-1} + e_{L2} \cdot \alpha^0 + e_{L1} \cdot \alpha^{L1} + e_{L1} \cdot \alpha^{L1-1} + e_{L2}$$
$$s_2 = e_{L1} \cdot (\alpha^{L1})^2 + e_{L1} \cdot (\alpha^{L1-1})^2 + e_{L2} \cdot (\alpha^0)^2$$
$$= e_{L1} \cdot (\alpha^{L1})^2 + e_{L1} \cdot (\alpha^{L1-1})^2 + e_{L2}$$

-continued $$\vdots$$
$$s_{m-1} = e_{L1} \cdot (\alpha^{L1})^{m-1} + e_{L1} \cdot (\alpha^{L1-1})^{m-1} + e_{L2} \cdot (\alpha^0)^{m-1}$$
$$= e_{L1} \cdot (\alpha^{L1})^{m-1} + e_{L1} \cdot (\alpha^{L1-1})^{m-1} + e_{L2}$$

If n respective errors existed at locations L 1, L 2, ..., L n (for any i (i=0, ..., n), L i≠0) in the 2nd scrambled data 103 and, after descrambling, the errors increased to (n+1) or more errors, $$s_0 = \sum_{i=1}^{n}(e_{Li} + e_{Li}) = 0$$
$$s_1 = \sum_{i=1}^{n}(e_{Li} \cdot \alpha^{Li} + e_{Li} \cdot \alpha^{Li-1}) = (1 + \alpha^{-1})\sum_{i=1}^{n} e_{Li} \cdot \alpha^{Li}$$
$$s_2 = \sum_{i=1}^{n}\left(e_{Li} \cdot (\alpha^{Li})^2 + e_{Li} \cdot (\alpha^{Li-1})^2\right) = (1 + \alpha^{-1})\sum_{i=1}^{n} e_{Li} \cdot (\alpha^{Li})^2$$
$$\vdots$$
$$s_{m-1} = \sum_{i=1}^{n}\left(e_{Li} \cdot (\alpha^{Li})^{m-1} + e_{Li} \cdot (\alpha^{Li-1})^{m-1}\right)$$
$$= (1 + \alpha^{-1})\sum_{i=1}^{n} e_{Li} \cdot (\alpha^{Li})^{m-1}$$

If n respective errors existed at locations L 1, L 2, ..., L n (L n=0) in the 2nd scrambled data 103 and, after descrambling, the number of errors remained n or increased to more than n, $$s_0 = \sum_{i=1}^{n-1}(e_{Li} + e_{Li}) + e_{Ln} = e_{Ln}$$
$$s_1 = \sum_{i=1}^{n-1}(e_{Li} \cdot \alpha^{Li} + e_{Li} \cdot \alpha^{Li-1}) + e_{Ln} = (1 + \alpha^{-1})\sum_{i=1}^{n-1} e_{Li} \cdot \alpha^{Li} + e_{Ln}$$
$$s_2 = \sum_{i=1}^{n-1}\left(e_{Li} \cdot (\alpha^{Li})^2 + e_{Li} \cdot (\alpha^{Li-1})^2\right) + e_{Ln}$$
$$= (1 + \alpha^{-1})\sum_{i=1}^{n-1} e_{Li} \cdot (\alpha^{Li})^2 + e_{Ln}$$
$$\vdots$$
$$s_{m-1} = \sum_{i=1}^{n-1}\left(e_{Li} \cdot (\alpha^{Li})^{m-1} + e_{Li} \cdot (\alpha^{Li-1})^{m-1}\right) + e_{Ln}$$
$$= (1 + \alpha^{-1})\sum_{i=1}^{n-1} e_{Li} \cdot (\alpha^{Li})^{m-1} + e_{Ln}$$

According to this, the following describes the flows of error correction processing in FIG. 1 with reference to FIG. 17. First in the error correction processing, syndrome calculation 1701 is performed on an error correction code-encoded data column which may contain one or more errors. In the same manner as the conventional method, syndrome $s_i$ is calculated by using the circuit of FIG. 18 or calculating Y(x) m o d (x−$\alpha_i$) by software. In the conventional method, however, if at least one syndrome $s_i$ is not 0, error locator and evaluator polynomials are immediately generated as shown at 1702 in FIG. 17 by such a method as Euclid's algorithm from the calculated syndrome. In syndrome calculation 1701 in the process of error correction shown in FIG. 1, calculation according to the algorithm shown in FIG. 2 is added to change the value of syndrome $s_i$ before the subsequent steps: generating error locator and evaluator polynomials 1702; calculating error location 1703, calculating error value 1704; and finally using the calculated error location and value to remove an error from the data column which was found to have an error 1705.

Figure 2:
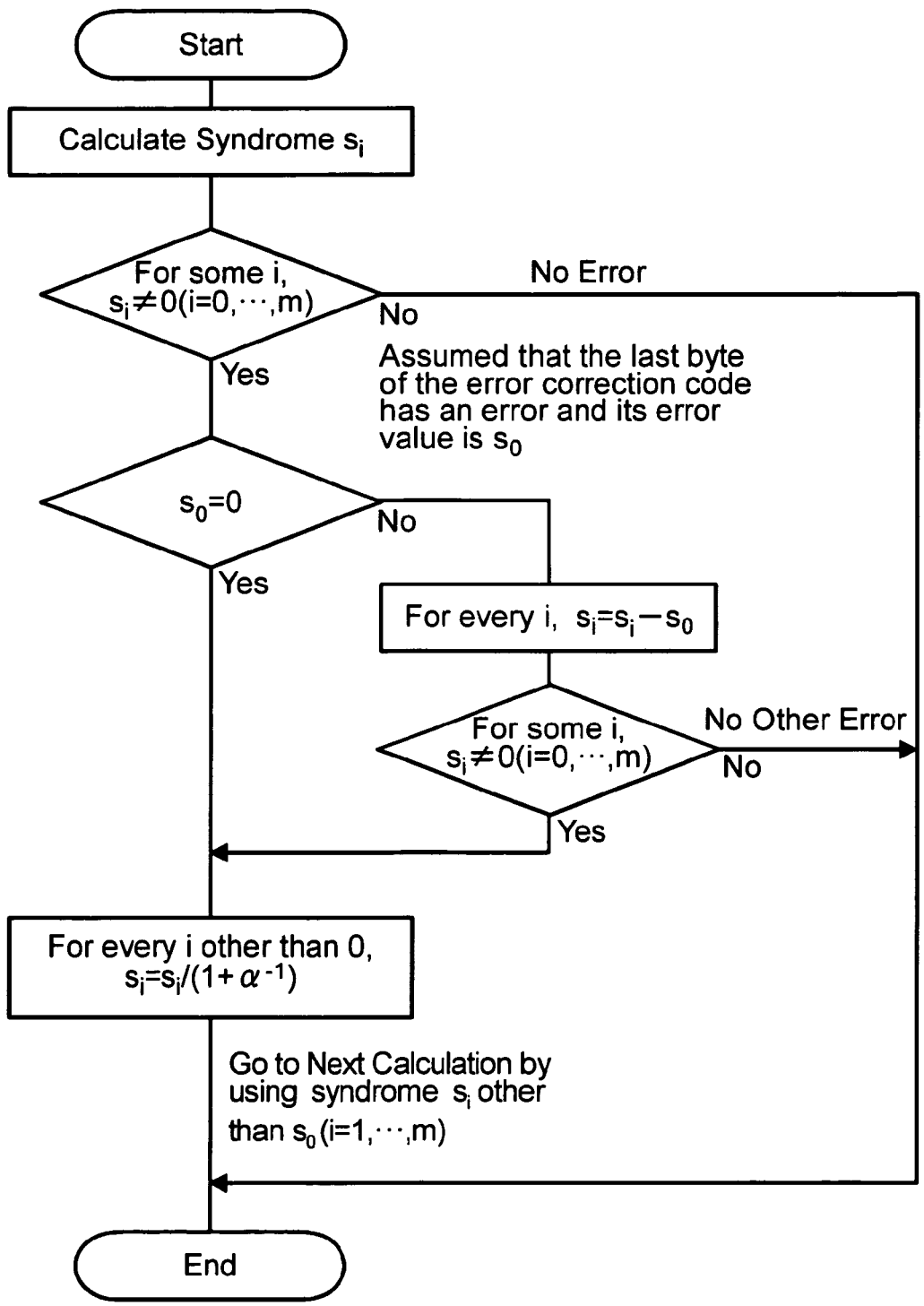
FIG. 2 is a flowchart illustrating a first example of syndrome calculation processing according to the present invention.

FIG. 2 is a flowchart showing the flows of syndrome calculation within the error correction processing shown in FIG. 1. Like in the conventional method, first, it is determined for every i whether calculated syndrome $s_i$ is 0. If all syndromes are 0, the error correction code-encoded data column 104 which may contain processing is found to have no error and the processing is terminated. However, if at least one syndrome $s_i$ is not 0, it is determined that this data column 104 contains an error and then it is established whether $s_0$ is 0. If $s_0$ is not 0, it is determined that an error whose value is $s_0$ is contained in the last byte of the data column as described earlier. In this case, $s_0$ is subtracted from every syndrome $s_i$, that is, $s_i = s_i - s_0$ is performed. Then, if $s_i$ is zero for every i, it is decided that there are no other errors. If at least one syndrome $s_i$ is not 0, it is decided that at least one another error exists. Then, processing goes to a step of performing $s_i = s_i/(1-\alpha^{-1})$ for every i that is other than 0. Note that processing also branches to this step from a step where it is judged whether $s_o$ is 0. (This division by a fixed value does not pose a large calculation load since it can be performed as multiplication by a fixed value.) Then, using syndrome $s_i$ generated in this manner for i=1, . . . , m−1 excluding 0, error locator and evaluator polynomials are generated as shown at 1702 in FIG. 17.

Thus, after the location and value of an error is calculated as shown at 1703 and 1704, respectively, in FIG. 17 by using syndrome $s_i$ obtained in this manner, correction (removal) processing 1705 is done on the assumption that the same value error is included in a data byte which immediately follows the calculated error location. Therefore, it is also possible to remove (correct) errors which have occurred as a result of propagation during random seed data scrambling. Needless to say, in the error removal (correction) 1705, an error can be removed (corrected) which is revealed to exist in the last data byte of a data column if the corresponding syndrome $s_o$ is not 0 during syndrome calculation.

Figure 19:
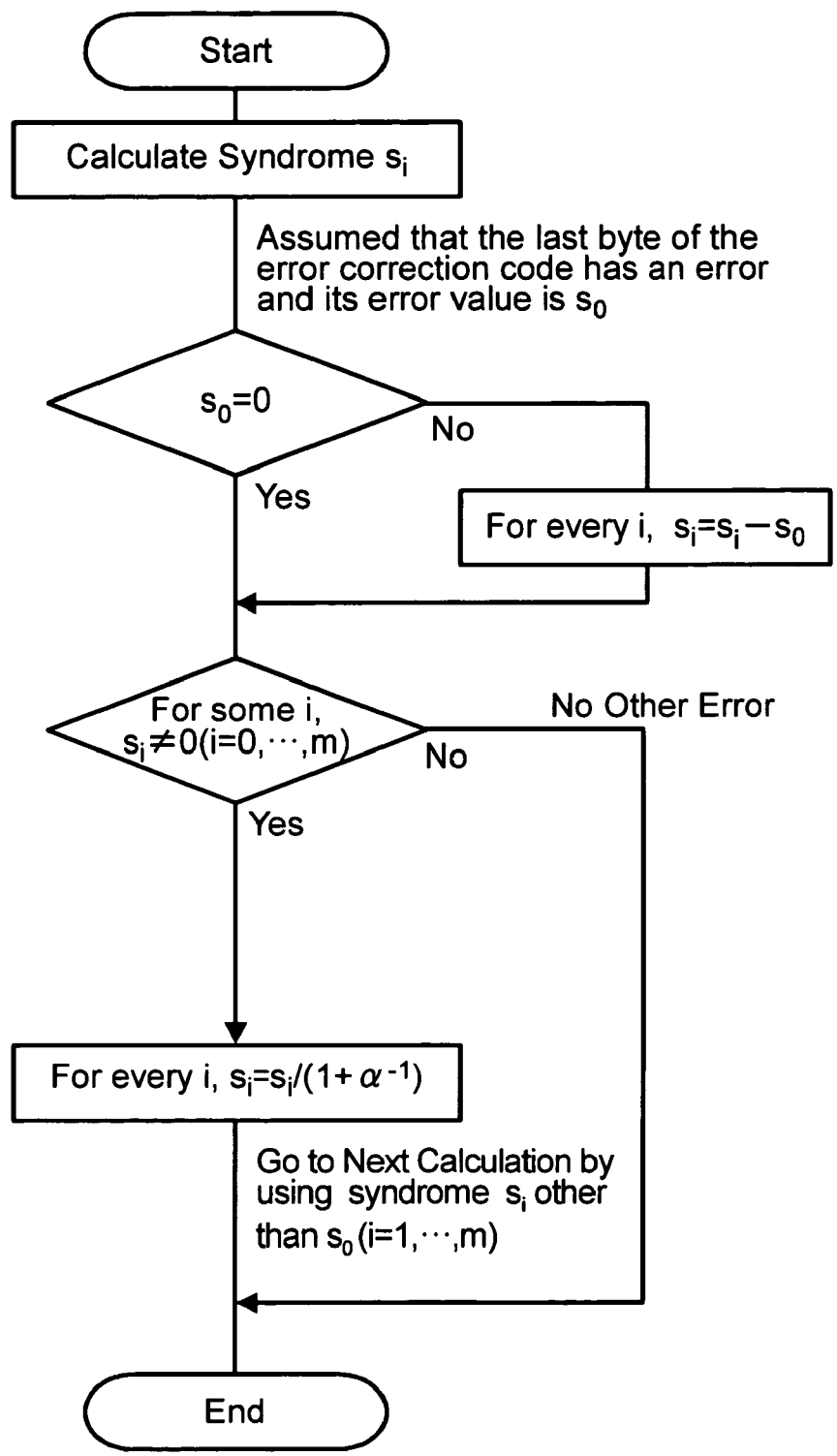
FIG. 19 is a flowchart illustrating a second example of syndrome calculation processing according to the present invention.

The same result can also be attained by using a syndrome calculation algorithm shown in FIG. 19 instead of the method shown in FIG. 2.

Figure 20:
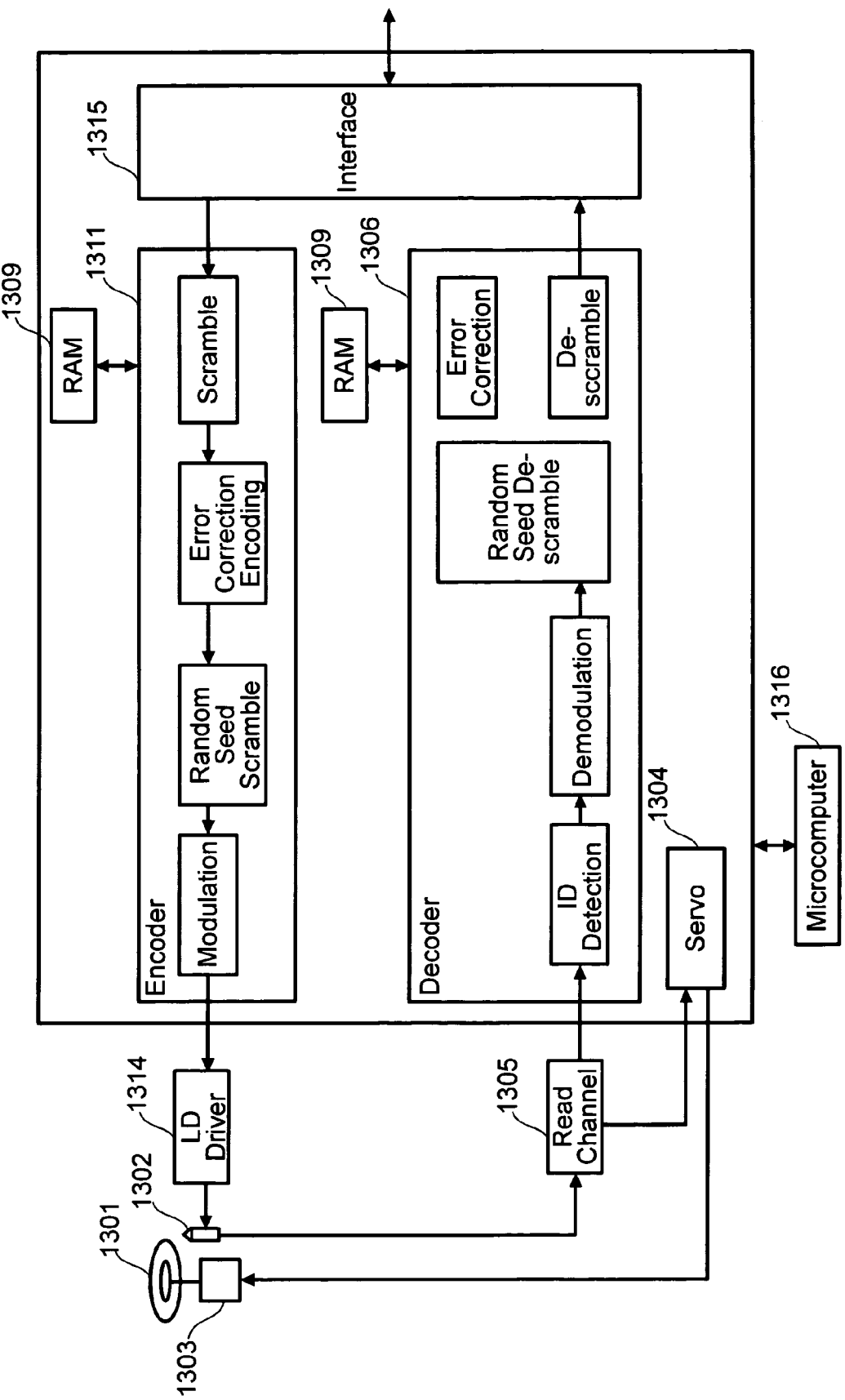
FIG. 20 is a block diagram illustrating a DVD recording and reproduction system according to the present invention.

A DVD drive including this error correction is configured as shown in FIG. 20. Although such specific techniques as a random seed scrambling method assuming a 2-byte error propagation and using a scramble polynomial S (x)=x8, are cited to describe the present invention, the scope of the present invention is not limited to these techniques. The present invention can be used widely to correct multiple instances of the same error that occurs across adjacent symbols. Error correction processing according to the present invention therefore allows all record data to be scrambled after error correction encoding is done.

Because the present invention enables random seed scrambling, which is conventionally aimed at preventing the recording layer of a phase-changed optical disk from deteriorating, to be performed after error correction encoding is done, all record data including ID can be scrambled. As a result, it is possible to attain steady servo characteristics without the needing to re-perform error correction encoding when the scrambling seed value is changed.

Although the preferred embodiment of the invention has been disclosed for illustrative purposes, those skilled in the art will appreciate that various modifications, additions and substitutions are possible, without departing from the scope and spirit of the invention as disclosed in the accompanying claims.

What is claimed is:

1. A data reproducing method for reproducing recorded data from a recording medium wherein said recorded data is generated by generating an error correction block by adding error correcting parity to data comprising main data, identification data and error correcting parity for the main data and the identification data; and converting the data in the error correction block by superimposing data, generated from data conversion information, on the data in the error correction block, said data reproducing method comprising the steps of:
   reading out the data conversion information from the recording medium;
   generating the superimposed data from the data conversion information;
   de-converting the converted data by using the data conversion information read out and the superimposed data generated;
   calculating syndromes of the de-converted data and, if one of the calculated syndromes, Sn (n is an integer), is not zero, making a judgment that the last data of the de-converted data includes an error, correcting the last data and returning the corrected last data into the error correction block; and
   reproducing the data in the error correction block by removing the error correcting parity from the error correction block.

2. A data reproducing method according to claim 1 wherein the syndrome Sn indicates a value of error included in the last one of the de-converted data.

3. A data reproducing method according to claim 1 wherein after the judgment is made, a value obtained by dividing a difference between each of the plural calculated syndromes and said Sn by $(1+\alpha^{-1})$ is used.

4. A data reproducing method according to claim 1 wherein after the judgment is made, it is judged that other data which is specified in the de-converting step also includes an error.

5. A data reproducing method according to claim 4 wherein after the judgment is made, a value of the error in the other data, judged to include an error, is calculated.

6. A data reproducing apparatus for reproducing recorded data from a recording medium wherein said recorded data is generated by: generating an error correction block by adding error correcting parity to data comprising main data, identification data and error correcting parity for the main data and the identification data; and converting the data in the error correction block by superimposing data, generated from data conversion information, on the data in the error correction block, said data reproducing apparatus comprising:
   means for reading out the data conversion information from the recording medium;
   means for generating the superimposed data from the data conversion information;
   means for de-converting the converted data by using the data conversion information read out and the superimposed data generated;
   means for calculating syndromes of the de-converted data and, if one of the calculated syndromes, Sn (n is an integer), is not zero, making a judgment that the last data of the de-converted data includes an error, correcting the last data and returning the corrected last data into the error correction block; and means for reproducing the data in the error correction block by removing the error correcting parity from the error correction block.

7. A data reproducing apparatus according to claim 6 wherein the syndrome Sn indicates a value of error included in the last one of the de-converted data.

8. A data reproducing apparatus according to claim 6 wherein after the judgment is made, a value obtained by dividing a difference between each of the plural calculated syndromes and said Sn by $(1+\alpha^{31\ 1})$ is used.

9. A data reproducing apparatus according to claim 6 wherein after the judgment is made, it is judged that other data which is specified in the de-converting step also includes an error.

10. A data reproducing apparatus according to claim 9 wherein after the judgment is made, the value of the error in the other data, judged to include an error, is calculated.

* * * * *